Figure 1:
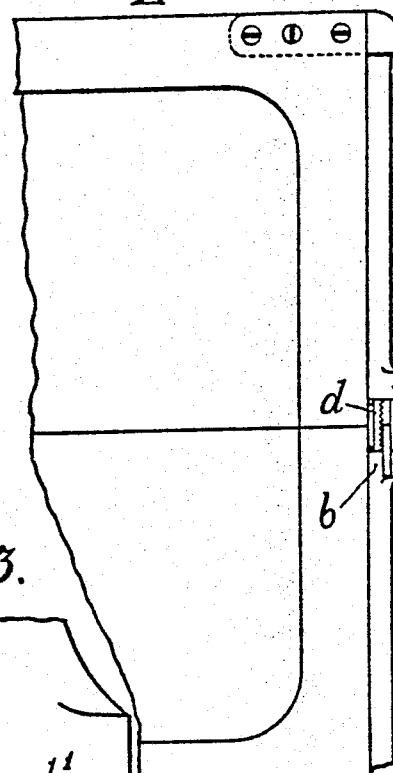

A. C. AUSTER.
HINGE JOINT FOR FOLDING WIND SCREENS.
APPLICATION FILED JUNE 25, 1908.

920,713.

Patented May 4, 1909.
3 SHEETS—SHEET 1.

WITNESSES

INVENTOR Arthur C. Auster

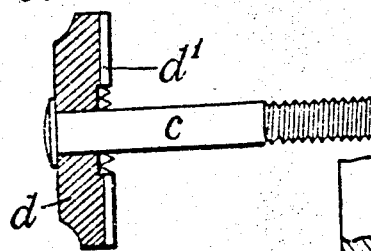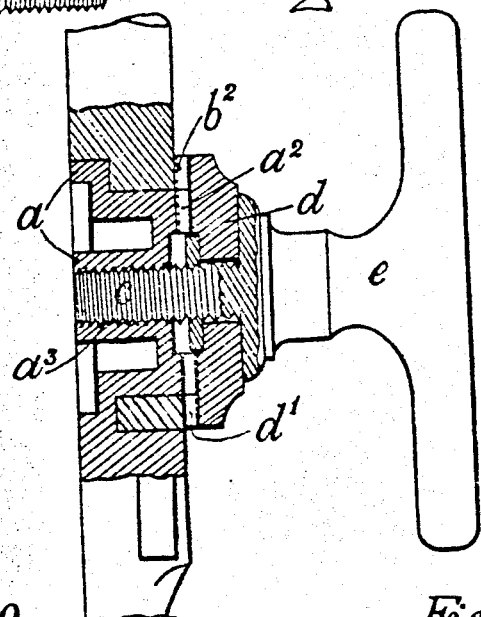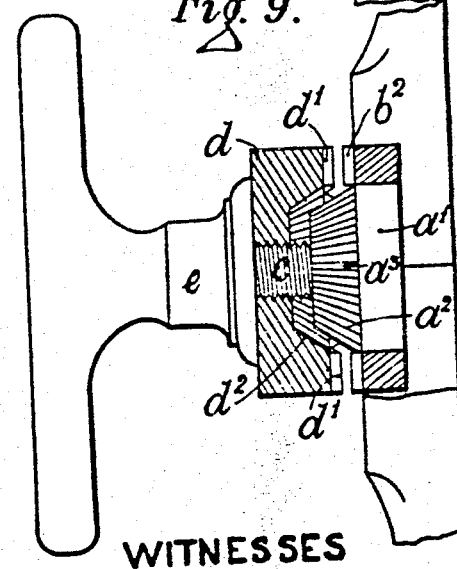

UNITED STATES PATENT OFFICE.

ARTHUR COLLINS AUSTER, OF BIRMINGHAM, ENGLAND.

HINGE-JOINT FOR FOLDING WIND-SCREENS.

No. 920,713.    Specification of Letters Patent.    Patented May 4, 1909.

Application filed June 25, 1908. Serial No. 440,343.

*To all whom it may concern:*

Be it known that I, ARTHUR COLLINS AUSTER, a subject of the King of Great Britain, residing at Crown Works, Barford street, Birmingham, England, have invented certain new and useful Improvements in Hinge-Joints for Folding Wind-Screens, of which the following is a specification.

This invention has relation to joints or hinges for use in connection with folding or adjustable windscreens and other folding or adjustable fittings or attachments for automobiles and other vehicles; such joints or hinges being of that type which embody means for positively locking the two knuckles or parts to one another, and in any relative angular position, through the medium of systems of radial teeth or the like which are taken into and retained in engagement by the action of a screw or equivalent device.

The principal object of the present invention is to provide an improved construction of lock action hinge or joint in which the engagement and disengagement of the radial locking teeth can be effected without involving any lateral movement of either of the two principal knuckle elements of the joint and without necessitating the lateral displacement of the screen or other fitting of which the said joint forms a part. This object I propose to realize principally by an arrangement wherein teeth or projections on both knuckles or members of the joint are so disposed as to admit of the two sets being collectively engaged by corresponding teeth or recesses on a single locking, coupling or keeper device which, when in its effective position, serves to lock the said knuckles to one another and to thereby positively secure the hinged parts of the adjustable screen or the like at any desired relative angle or inclination.

Figure 2:
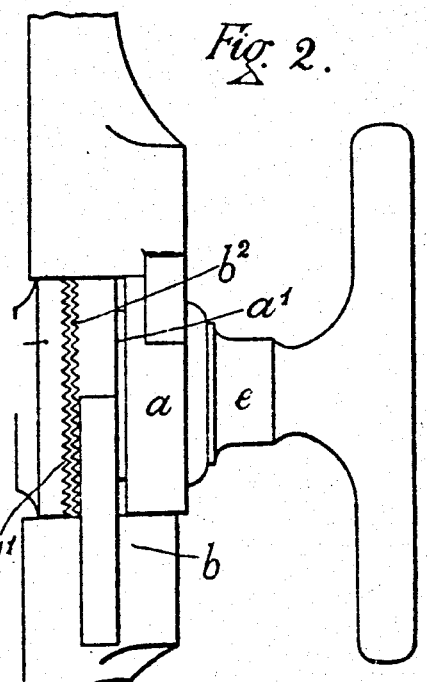
Figure 3:
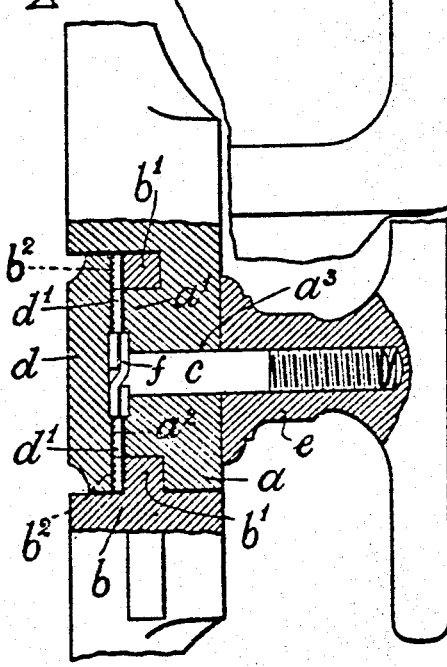
Figure 4:
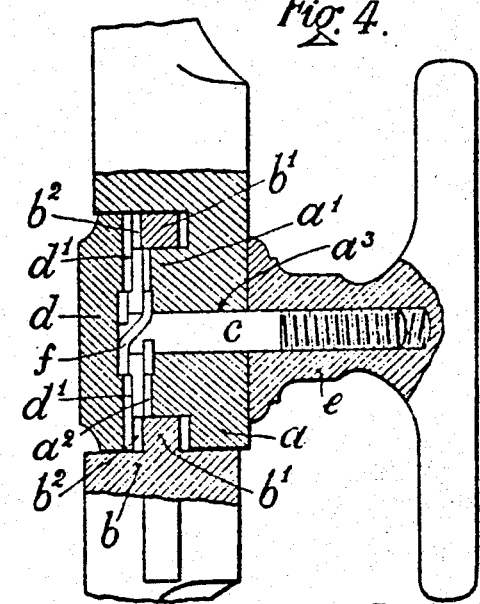
Figure 5:
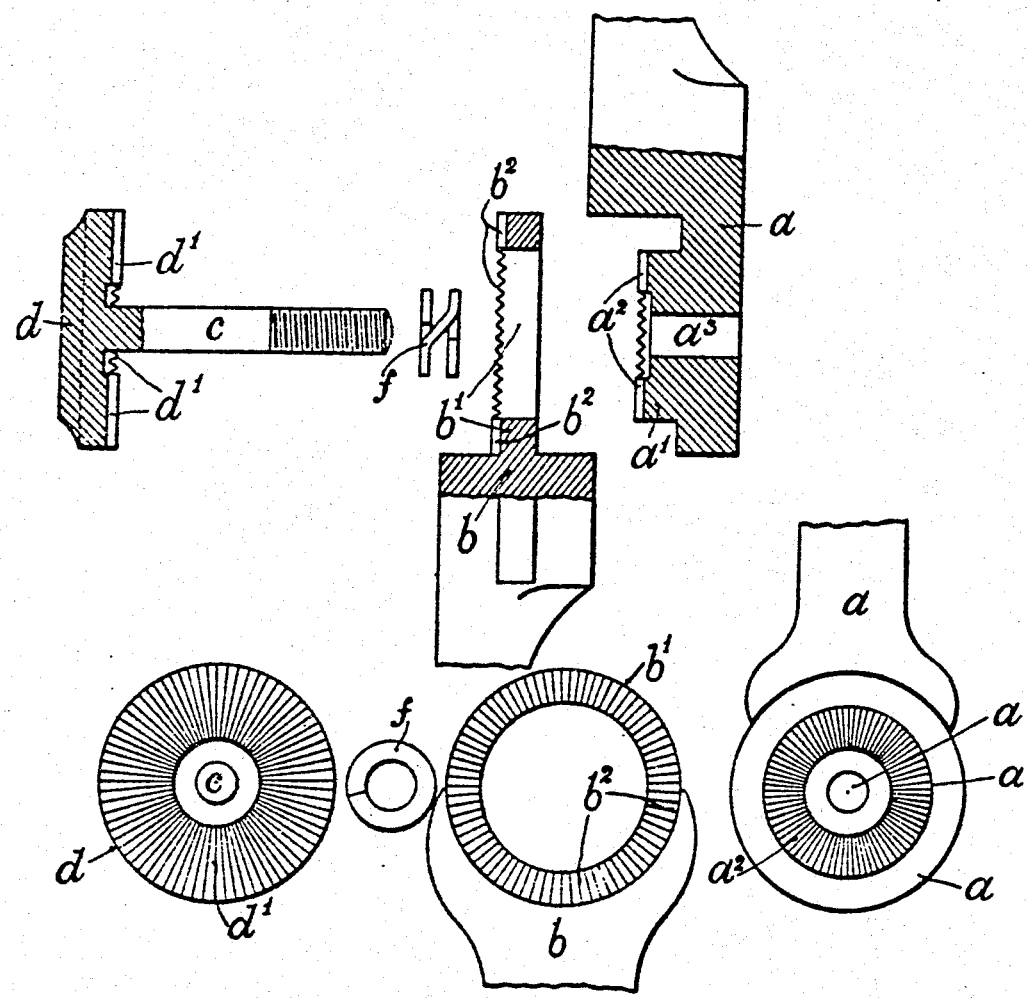

Figure 1 of the accompanying drawings represents a part of a folding wind screen provided with improved joints constructed in accordance with this invention. Fig. 2 is a side elevation of one of the joints of the said screen, showing how the locking or engaging elements are separated so that the joint can be adjusted to any desired angle. Fig. 3 represents a vertical section of the joint in its locking position. Fig. 4 is a similar view showing the same unlocked, and the engaging parts separated. Fig. 5 shows the various component parts separated. Fig. 6 is a view of another form in which the locking element is loose upon its pin. Fig. 7 represents a section of a modified form of joint constructed in accordance with this invention. Fig. 8 is a section of another modified form of joint. Fig. 9 is a section of a joint constructed in accordance with a further modification.

Referring to the construction shown in Figs. 1 to 5, the face of the knuckle or element $a$ of the joint is provided with a laterally-projecting sleeve or bush $a^1$, whose end face is cut with teeth $a^2$, radiating from the center of a pin $c$ which is passed through said bush. This sleeve or bush serves as the bearing for the other element $b$ of the joint, whose knuckle takes the form of a ring or eye $b^1$ that surrounds, and is capable of turning upon, said bush in adjusting the relative angle of the two parts of the joint. The inner face of this ring knuckle is plain, and lies and works against the corresponding plain face of the knuckle $a$ while the outer face of the said ring knuckle is designed to fall in the same plane as the serrated face of said bush or sleeve $a^1$ and is also formed with teeth or serrations $b^2$ radiating from the same center as those of the latter. By this arrangement, there is provided on the outer faces of the knuckles, two concentric rings of face teeth or serrations $a^2$ $b^2$, and the locking of the said knuckles at any desired relative angle is effected by means of a washer or plate $d$ which is fast upon the pin and has, upon its inner side, long radial teeth or serrations $d^1$ which—after the adjustment of the hinge—are adapted to be engaged collectively or in common with the concentric rings of teeth or serrations $a^2$, $b^2$, on the two knuckles and to thereby establish a positive union or locking connection between them. The pin $c$ is screw-threaded and is passed through a hole $a^3$ in the knuckle $a$ and is actuated, for moving said locking plate $d$ laterally into and out of engagement with the two knuckles by the action of a wing or other nut $e$ which is screwed on the outer end of the pin $c$, and takes a bearing against the face of the knuckle $a$. To facilitate the lateral separation of the toothed parts and to disconnect the two knuckles, a spring $f$ is arranged to surround the pin and be compressed between opposed plain parts of the locking or coupling plate $d$ and the bearing bush $a^1$ when the parts are drawn together, whereas when the nut $e$ is unscrewed, the spring expands sufficiently to clear the teeth of the plate $d$ from the two sets of teeth $a^1$, $b^2$, on the knuckles. Instead of the locking plate $d$ being fixed upon its pin $c$, it may be carried loosely thereon as represented in Fig. 6.

In the arrangement shown in Fig. 7 the locking plate $d$, provided with the radial teeth $d^1$, is loosely mounted on the outer end of the pin or bolt $c$, which carries the fixed handle or grip $e$, at its outer end; the said pin being screw-threaded and adapted to work within an internally screw-threaded hole $a^3$ in the member $a$ of the joint. By this means as the pin or bolt is rotated by the said grip $e$, the locking plate or washer $d$ is caused to move laterally to engage with the rings of teeth $a^1$, $b^2$.

In the modification shown in Fig. 8, the pin $c$ is provided at its inner end, with a head $c^1$ which bears against the back of the member $a$, while the locking plate or element $d$ is loosely strung upon the outer end of said pin, and its locking teeth are adapted to be taken collectively into engagement with those of the joint members by means of the internally screw-threaded boss of a handle or grip member $e$, which is screwed on to said pin $c$. The pitch of the teeth $a^2$ may be greater than that of the teeth $b^2$ as shown while the inner ring or portion $d^3$ of the teeth of the locking element $d$ are formed of corresponding increased pitch so as to engage with the said teeth $a^2$. By this means the teeth of the one part are more readily led into engagement with those of the other part.

In the modification shown in Fig. 9, the outer ring of teeth $b^1$ are formed radial as in the preceding forms, whereas the bearing bush $a^1$ is coned at $a^3$ on its outer face and the said coned surface formed with radial teeth or serrations $a^2$. The locking washer or plate $d$, (which is carried by the screw-threaded pin $c$), in addition to having radial teeth $d^1$ near its periphery to engage with the teeth $b^2$ of the knuckle $b$, is also provided with a central cone $d^2$ formed with teeth or serrations as shown. When the said washer is moved laterally by the action of the nut $e$, the cone $a^3$ sockets into the engaging coned part $d^2$, so that the two sets of teeth engage with one another simultaneously with the engagement of the teeth $d^1$ and $b^2$.

Having fully described our invention, what we desire to claim and secure by Letters Patent is:—

1. In a hinge joint of the type set forth, in combination, two joint members having rotatably assembled and related hinge portions provided with annular concentric rows of teeth, a laterally movable locking member having teeth on one of its side faces for common engagement with the teeth of said hinge portions, and means for adjusting said locking member axially toward and away from said hinge portions to engage or disengage the teeth thereof.

2. In a hinge joint of the type set forth, in combination, two joint members having rotatably assembled and related hinge portions provided with annular concentric rows of teeth, a laterally movable locking member having teeth on one of its side faces for common engagement with the teeth of said hinge portions, means for adjusting said locking member axially toward and away from said hinge portions to engage or disengage the teeth thereof and spring means interposed between the inner hinge portion and the locking member and acting to assist in forcing the latter outwardly.

3. In a hinge joint of the type set forth, in combination, two joint members, one having a laterally extending bearing and the other having a ring portion surrounding said bearing, said bearing and said ring portion being formed with concentric annular rows of teeth, an axially movable plate having locking teeth on one of its side faces for common engagement with said first named teeth, and means for adjusting said plate toward and away from said joint members to engage or disengage said teeth.

4. In a hinge joint of the type set forth, in combination, two joint members having rotatably assembled and related hinge portions provided with annular rows of teeth one within the other, an axially adjustable pin and a plate loosely mounted on said pin and having locking teeth for common engagement with the teeth of said hinge portions.

5. In a hinge joint of the type set forth, in combination, two joint members having hinge portions formed with locking teeth, one of said hinge portions being conical in form, and the other hinge portion being of ring form and surrounding the conical portion, a locking plate having a conical socket to receive the conical hinge portion and having also teeth for engagement with the teeth of said hinge portions and means for adjusting said plate toward and away from said hinge portions to engage or disengage said teeth.

In testimony whereof I have hereunto set my hand in presence of two subscribing witnesses.

ARTHUR COLLINS AUSTER.

Witnesses:
HENRY SKERRETT,
HENRY NORTON SKERRETT.